US011217837B2

(12) United States Patent
Day et al.

(10) Patent No.: US 11,217,837 B2
(45) Date of Patent: Jan. 4, 2022

(54) APPARATUS AND METHOD FOR LITHIUM-ION CELLS

(71) Applicant: The Boeing Company, Chicago, IL (US)

(72) Inventors: Gregory R. Day, Madison, AL (US); Dwaine K. Coates, Madison, AL (US); Stephanie D. Babiak, Huntsville, AL (US); David E. Hall, Madison, AL (US)

(73) Assignee: The Boeing Company, Chicago, IL (US)

( * ) Notice: Subject to any disclaimer, the term of this patent is extended or adjusted under 35 U.S.C. 154(b) by 304 days.

(21) Appl. No.: 15/941,141

(22) Filed: Mar. 30, 2018

(65) Prior Publication Data

US 2019/0305392 A1    Oct. 3, 2019

(51) Int. Cl.
| | |
|---|---|
| *H01M 10/617* | (2014.01) |
| *H01M 10/0525* | (2010.01) |
| *H01M 10/6551* | (2014.01) |
| *H01M 10/625* | (2014.01) |
| *H01M 50/20* | (2021.01) |

(52) U.S. Cl.
CPC ..... *H01M 10/617* (2015.04); *H01M 10/0525* (2013.01); *H01M 10/625* (2015.04); *H01M 10/6551* (2015.04); *H01M 50/20* (2021.01); *H01M 2220/20* (2013.01)

(58) Field of Classification Search
CPC ........... H01M 10/617; H01M 10/0525; H01M 10/6551; H01M 10/625; H01M 2/1077; H01M 2220/20; Y02E 60/10
See application file for complete search history.

(56) References Cited

U.S. PATENT DOCUMENTS

| | | | | |
|---|---|---|---|---|
| 8,920,955 | B1* | 12/2014 | Chuang ............... | H01M 2/1077 429/99 |
| 2009/0297892 | A1* | 12/2009 | Ijaz ....................... | H01M 2/204 429/7 |
| 2014/0234677 | A1* | 8/2014 | Yoon ................... | H01M 2/1094 429/89 |
| 2014/0234687 | A1* | 8/2014 | Fuhr ...................... | H01M 2/12 429/120 |
| 2016/0006007 | A1* | 1/2016 | Takasaki .............. | H01M 50/116 429/99 |
| 2016/0049626 | A1* | 2/2016 | Yasui .................. | H01M 2/1229 429/54 |
| 2016/0064783 | A1* | 3/2016 | Chorian .............. | H01M 10/613 429/72 |

* cited by examiner

*Primary Examiner* — Cynthia K Walls
(74) *Attorney, Agent, or Firm* — Perman & Green, LLP

(57) ABSTRACT

An apparatus including a plurality of lithium-ion cells, a cell support structure having a plurality of chambers, each of the plurality of chambers has at least one open end and is configured to support a respective lithium-ion cell, a housing in which the cell support structure is received, and a thermal dissipation member disposed between the cell support and the housing, wherein the plurality of lithium-ion cells are thermally coupled to the thermal dissipation member through a respective open end of a respective chamber, and the thermal dissipation member is thermally coupled to the housing.

20 Claims, 11 Drawing Sheets

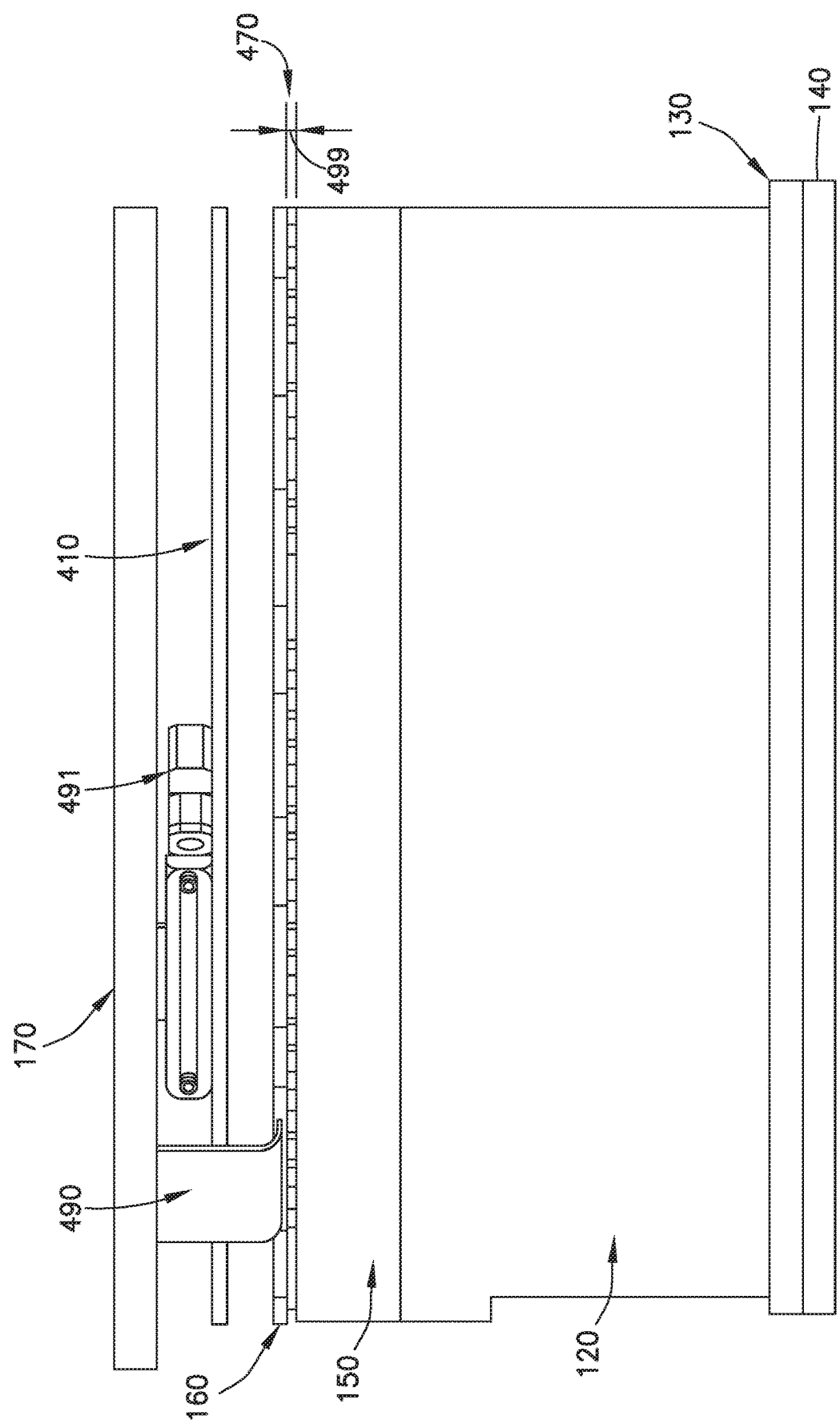

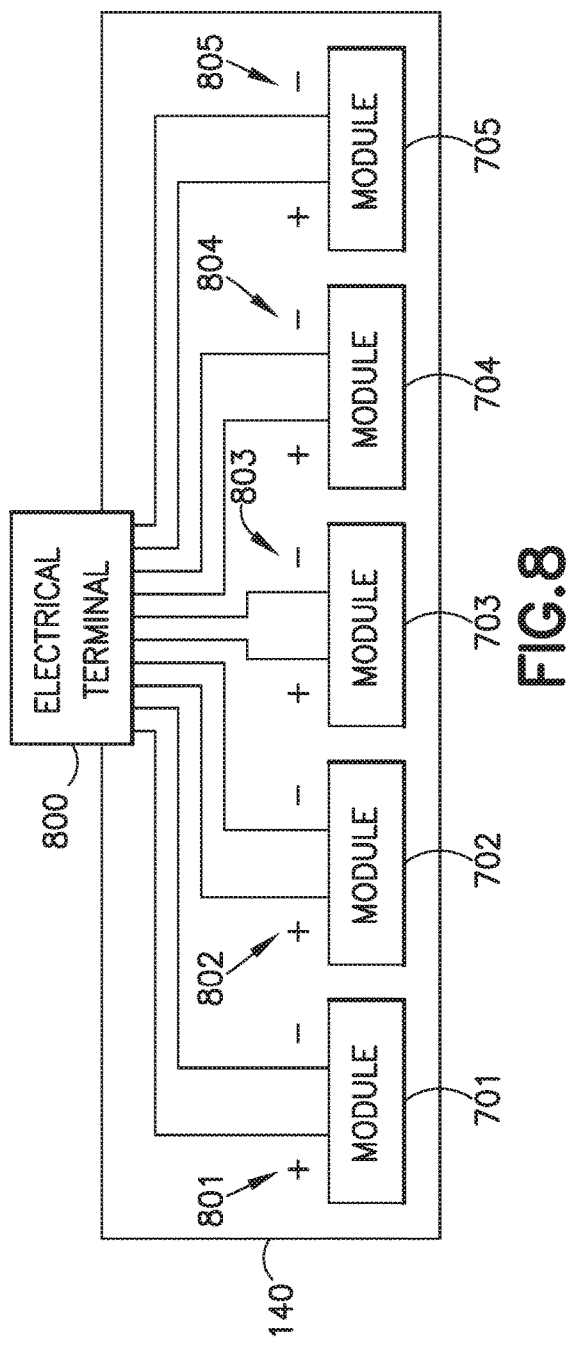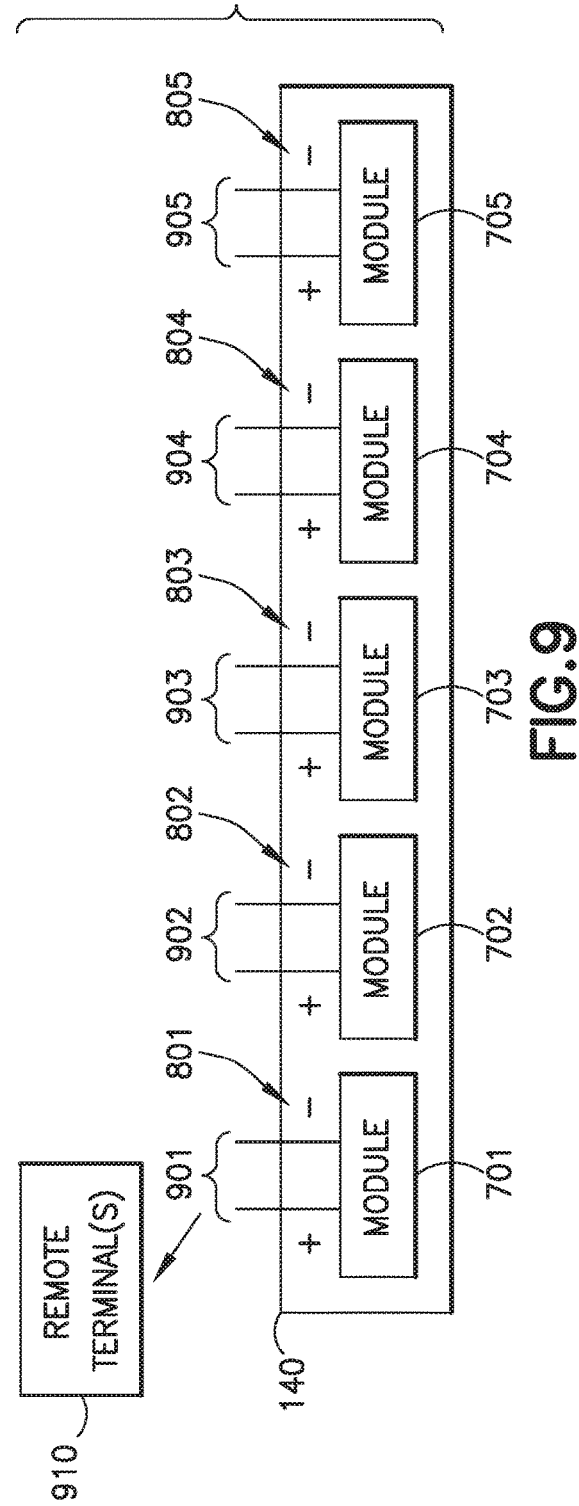

APPARATUS AND METHOD FOR LITHIUM-ION CELLS

The invention described herein was made in the performance of work under NASA Contract No. NNK14MA75C and is subject to the provisions of Section 305 of the National Aeronautics and Space Act of 1958 (72 Stat. 435: 42 U.S.C. 2457).

BACKGROUND

1. Field

The exemplary embodiments generally relate to lithium-ion cells and more particularly to dissipation of thermal energy from one or more lithium-ion cells.

2. Brief Description of Related Developments

Generally, lithium-ion battery pack technology is applicable to a broad range of application platforms due to its high energy density compared to, for example, nickel-cadmium batteries. The application platforms include, but are not limited to, aircraft, land vehicles, and space systems. The high energy density of a lithium-ion cell (which when considered in combination with other lithium-ion cells may be referred to as a "battery pack") may cause thermal runaway in the event of a failure of the lithium-ion cell. Battery design practices attempt to minimize causes of lithium-ion cell over-heating due to, for example, under-charging, over-charging, physical abuse, etc. However, flaws in the lithium-ion cells, due to, e.g., the manufacturing process of the lithium-ion cells, may not be detected. These flaws may cause a short within a lithium-ion cell which may cause thermal runaway of the lithium-ion cell.

Conventional solutions for preventing or mitigating thermal runaway of a lithium-ion battery include the use of various materials to thermally isolate one lithium-ion cell from another lithium-ion cell, such as when the lithium-ion cells are disposed in a battery pack having multiple lithium-ion cells coupled to each other. The thermal isolation of individual lithium-ion cells is intended to substantially prevent or limit propagation of a single lithium-ion cell thermal runaway event to other lithium-ion cells in the battery pack. However, providing thermal isolation between the lithium-ion cells poses cooling issues with respect to the cooling of the individual lithium-ion cells.

SUMMARY

Accordingly, apparatuses and methods, intended to address or solve at least one or more of the above-identified problems or concerns, would find utility.

The following is a non-exhaustive list of examples, which may or may not be claimed, of the subject matter according to the present disclosure.

One example of the subject matter according to the present disclosure relates to an apparatus comprising: a plurality of lithium-ion cells; a cell support structure having a plurality of chambers, each of the plurality of chambers has at least one open end and is configured to support a respective lithium-ion cell; a housing in which the cell support structure is received; and a thermal dissipation member disposed between the cell support structure and the housing; wherein the plurality of lithium-ion cells are thermally coupled to the thermal dissipation member through a respective open end of a respective chamber, and the thermal dissipation member is thermally coupled to the housing.

Another example of the subject matter according to the present disclosure relates to an apparatus comprising: a plurality of lithium-ion cells; a housing in which the plurality of lithium-ion cells are disposed; and a thermal dissipation member disposed between the housing and the plurality of lithium-ion cells, the thermal dissipation member being thermally coupled to the plurality of lithium-ion cells so as to dissipate thermal energy from one of the plurality of lithium-ion cells to at least another of the lithium-ion cells, at least partially through the thermal dissipation member.

Still another example of the subject matter according to the present disclosure relates to a method for thermally managing a plurality of lithium-ion cells disposed within a housing, the method comprising: thermally coupling the plurality of lithium-ion cells to each other through a thermal dissipation member disposed between the housing and the plurality of lithium-ion cells; wherein thermal energy is dissipated from one of the plurality of lithium-ion cells to at least another of the lithium-ion cells through at least the thermal dissipation member.

BRIEF DESCRIPTION OF THE DRAWINGS

Figure 1:
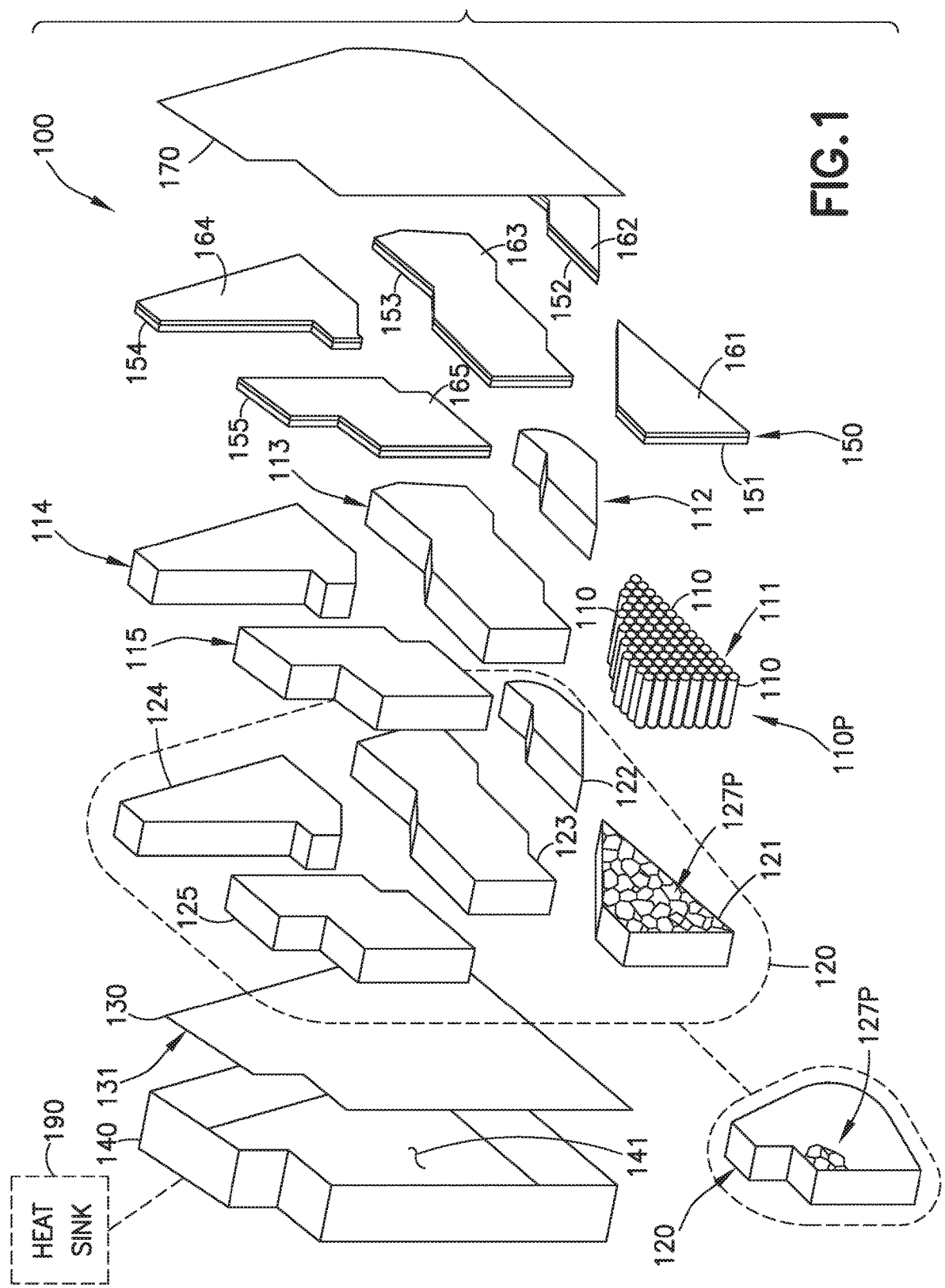
Figure 2:
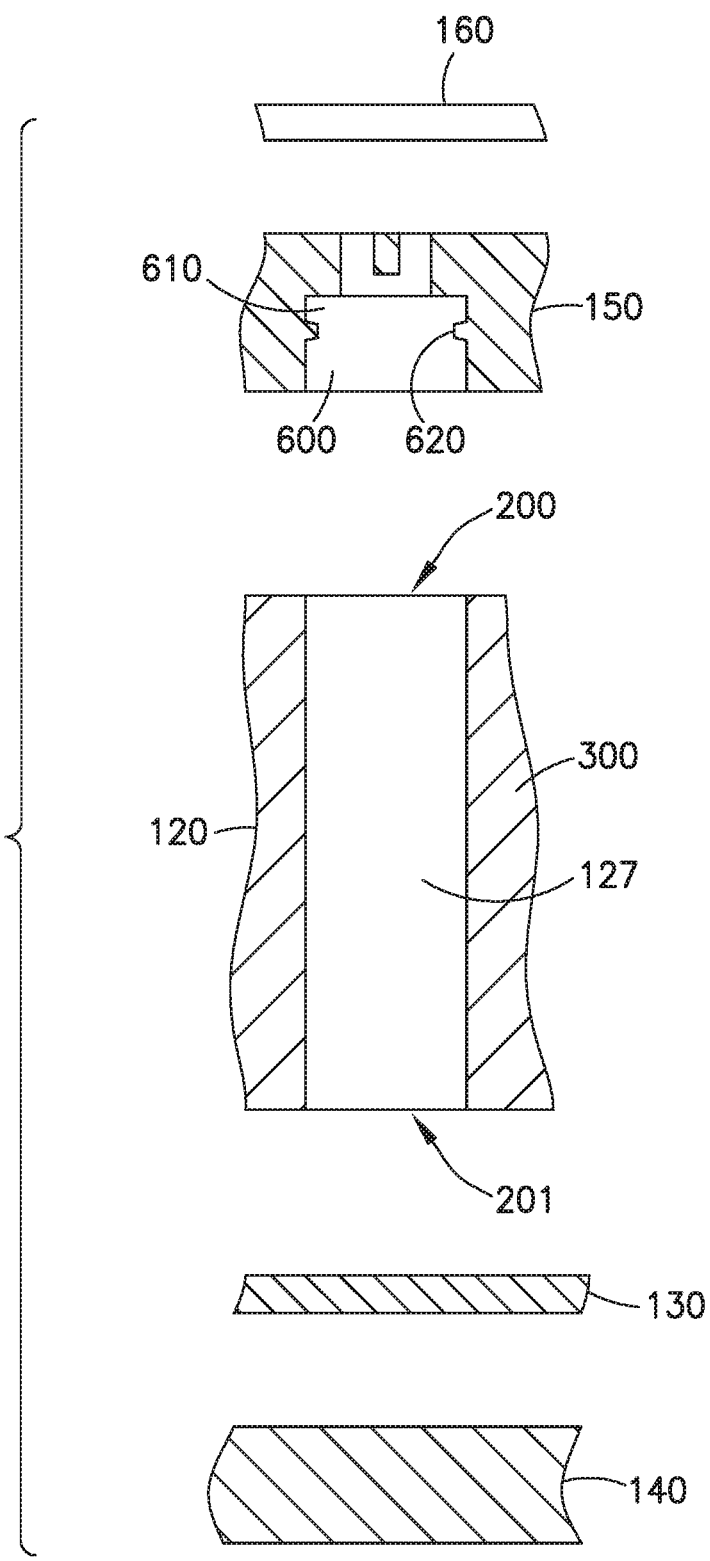
Figure 3:
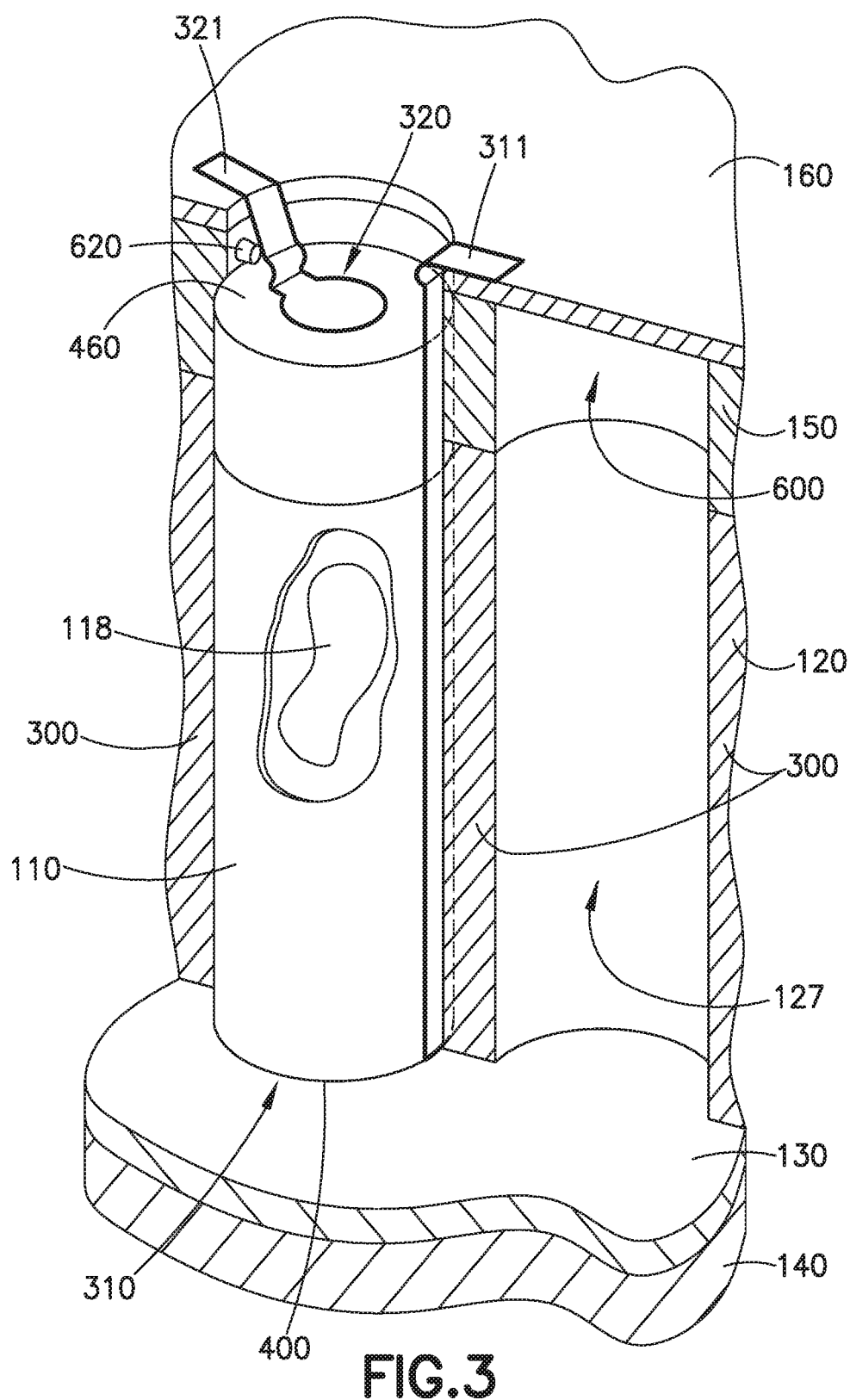
Figure 4:
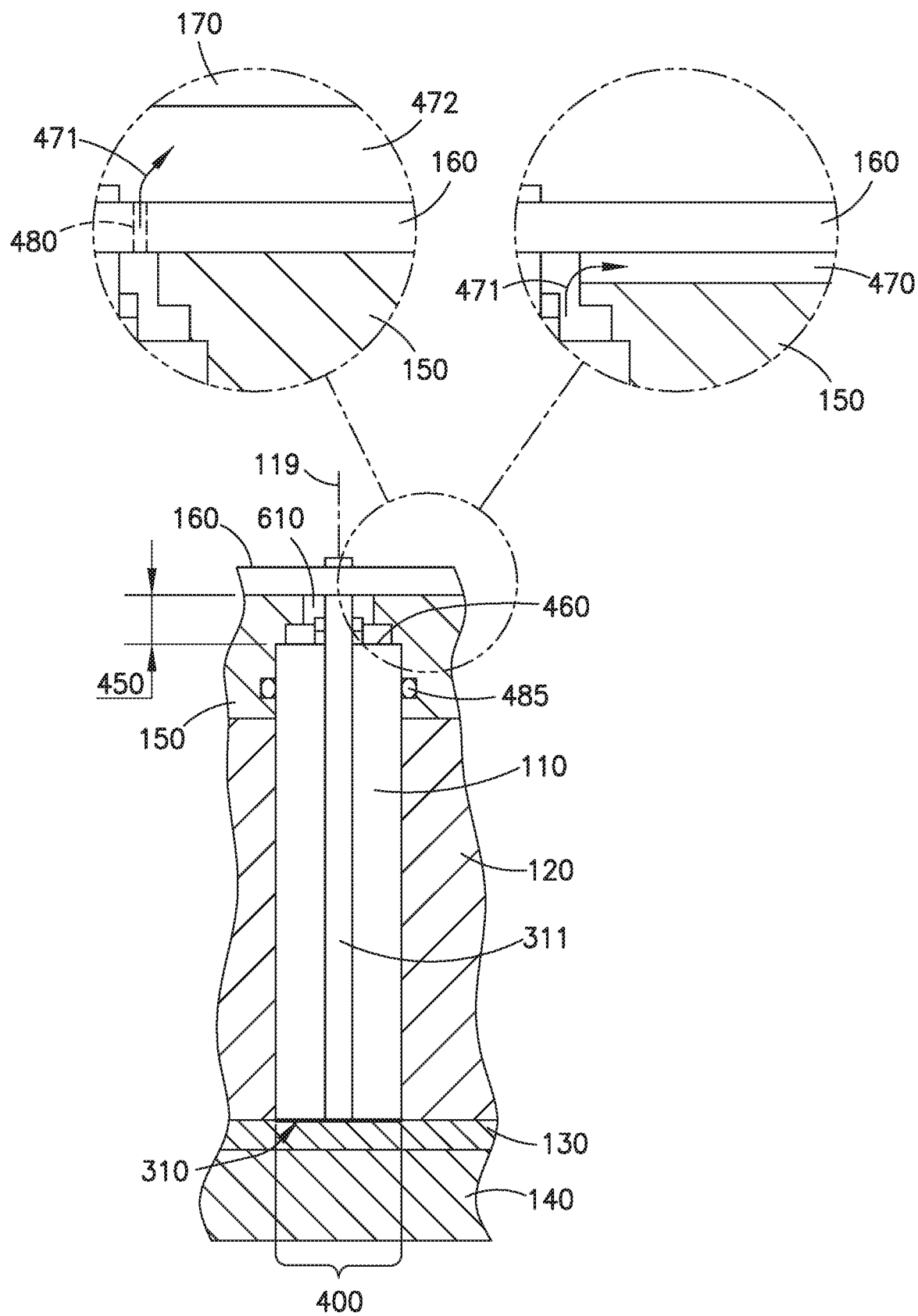
Figure 4B:
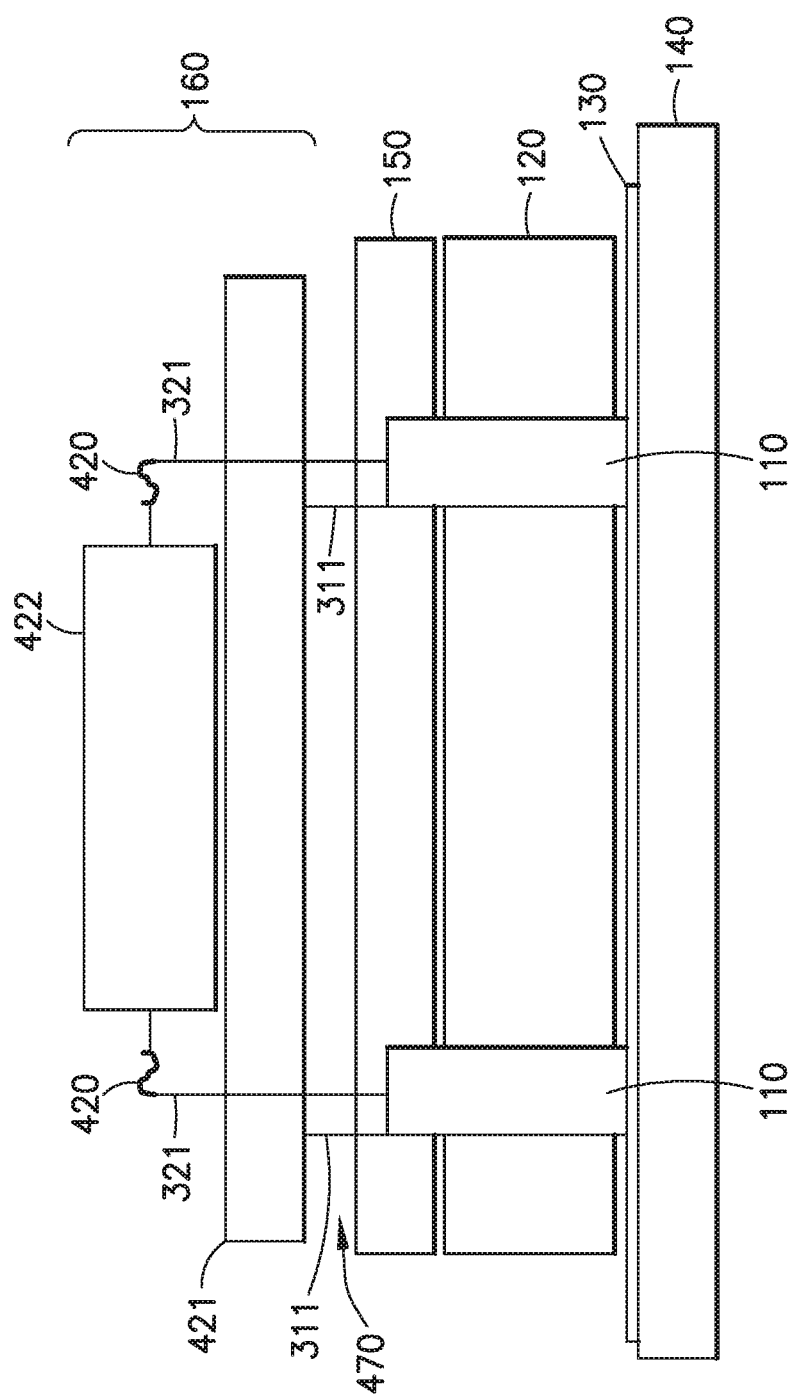
Figure 5:
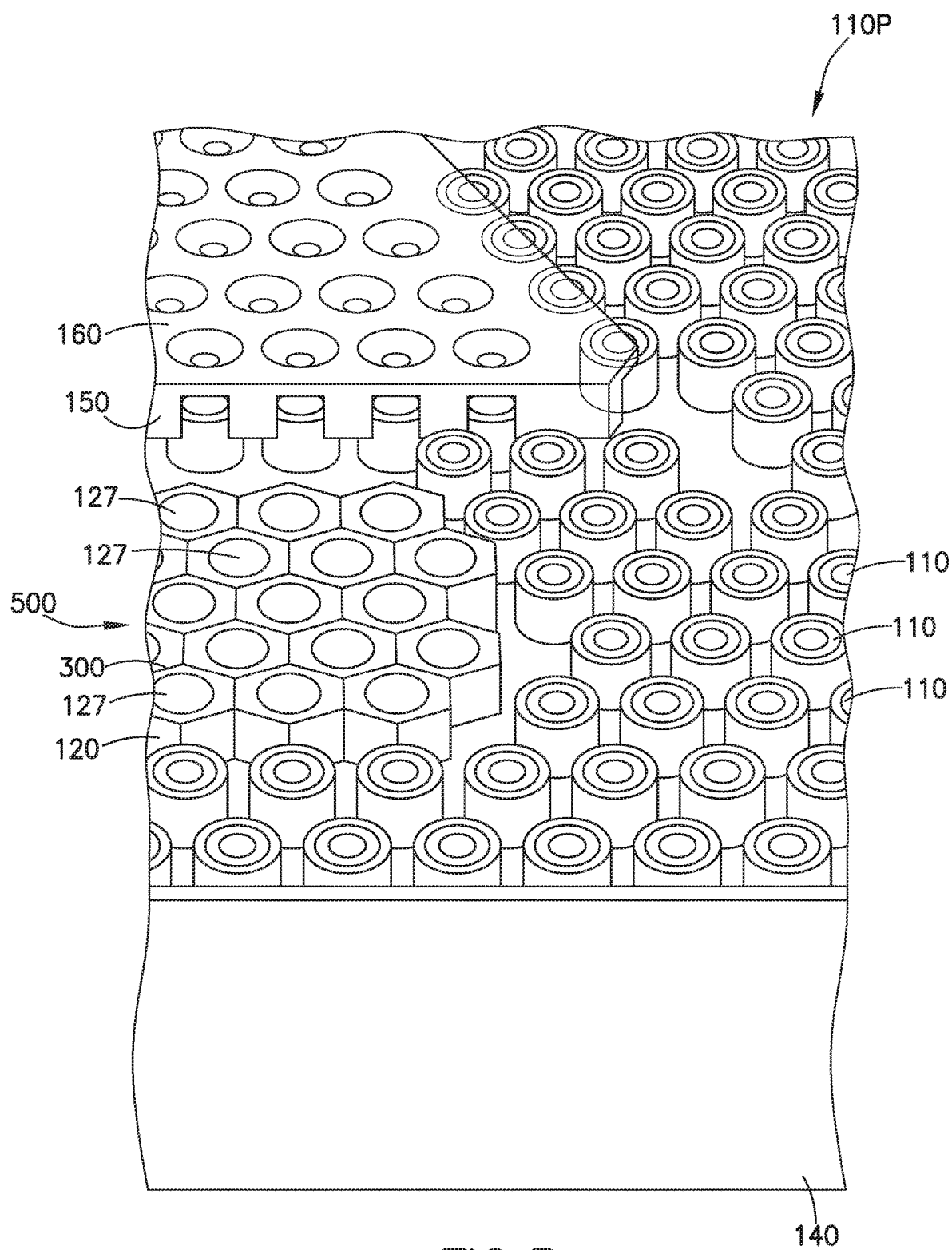
Figure 6:
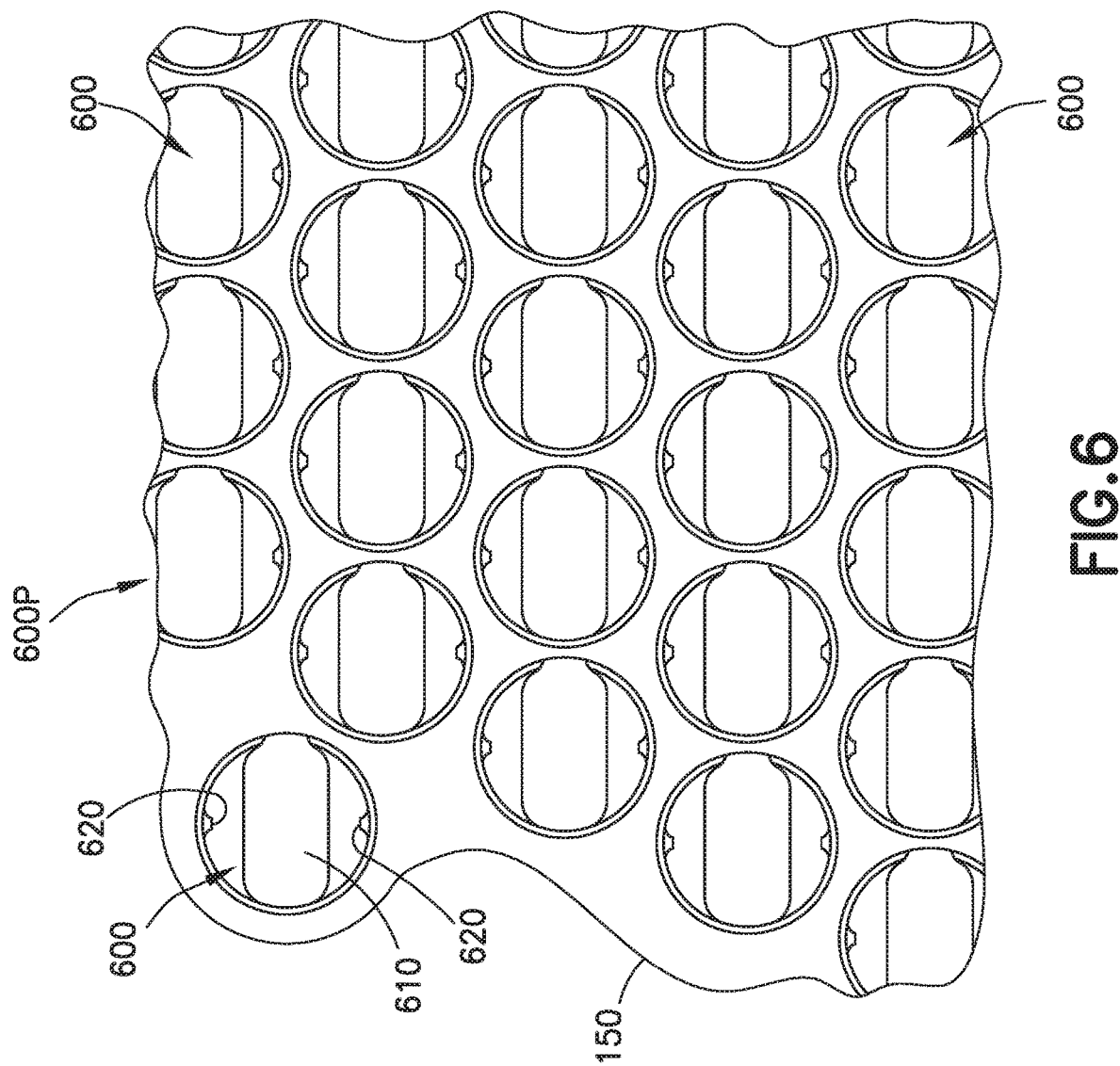
Figure 7:
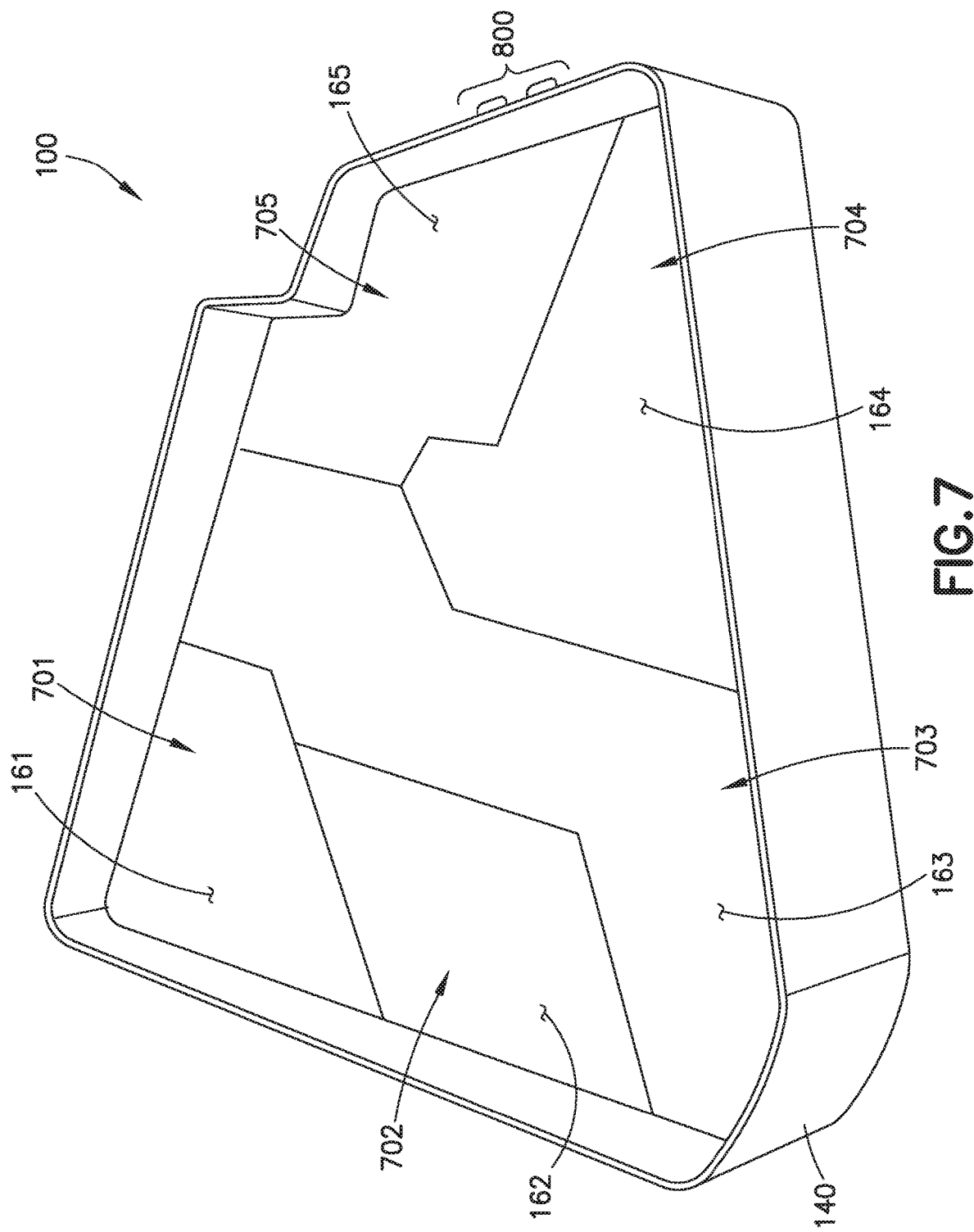
Figure 10:
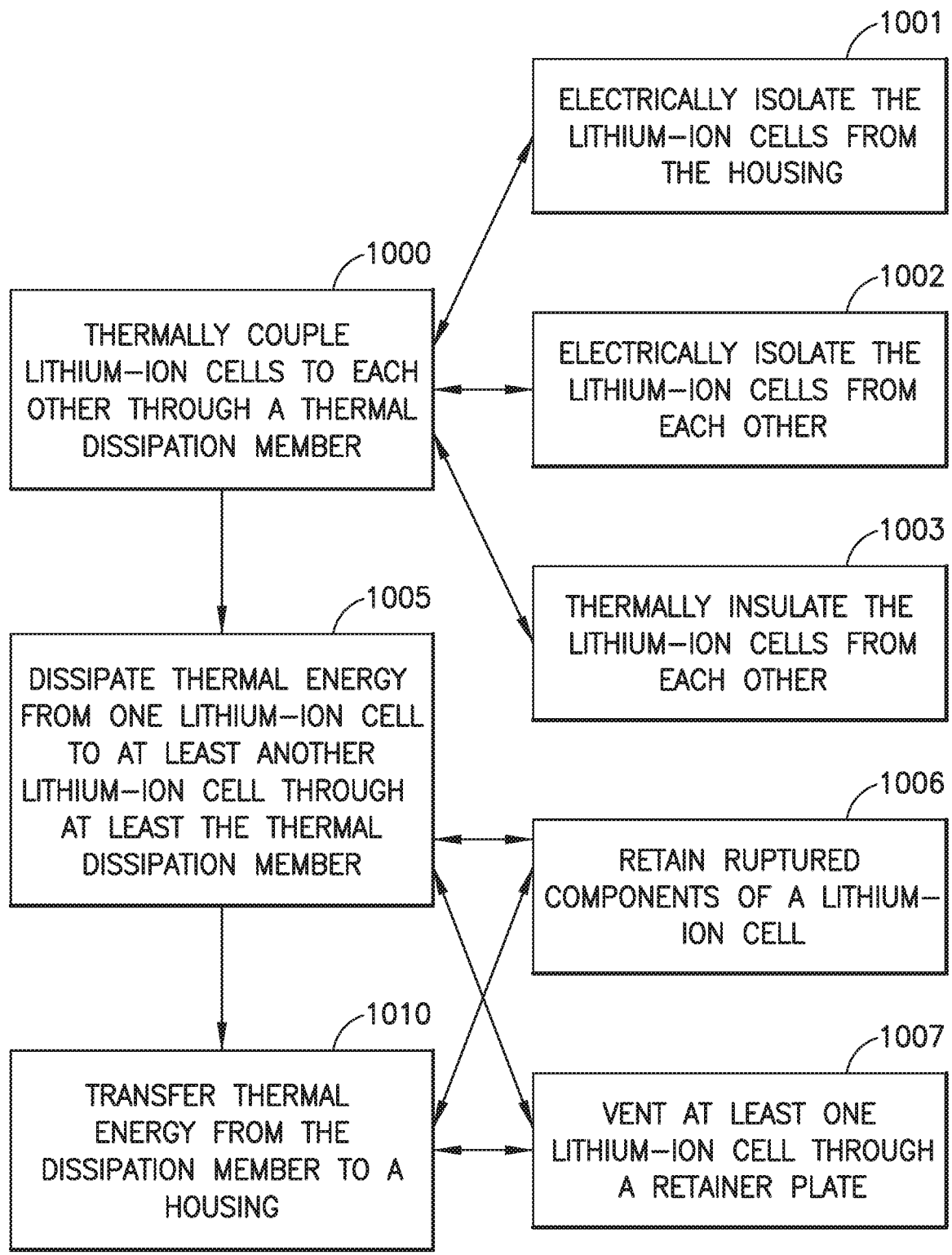

Having thus described examples of the present disclosure in general terms, reference will now be made to the accompanying drawings, which are not necessarily drawn to scale, and wherein like reference characters designate the same or similar parts throughout the several views, and wherein:

FIG. 1 is an exploded perspective view of an apparatus in accordance with aspects of the present disclosure;

FIG. 2 is a cross sectional exploded view of a portion of the apparatus of FIG. 1 in accordance with aspects of the present disclosure;

FIG. 3 is a perspective view of a portion of the apparatus of FIG. 1 in accordance with aspects of the present disclosure;

FIG. 4 is a cross sectional side view of the portion of the apparatus illustrated in FIG. 3, along with magnified views of certain areas of the apparatus;

FIG. 4A is another cross sectional side view of the portion of the apparatus illustrated in FIG. 3;

FIG. 4B is still another cross sectional side view of the portion of the apparatus illustrated in FIG. 3;

FIG. 5 is a partial perspective view of a portion of the apparatus of FIG. 1 in accordance with aspects of the present disclosure;

FIG. 6 is a plan view of a portion of the apparatus of FIG. 1 in accordance with aspects of the present disclosure;

FIG. 7 is a perspective view of a portion of the apparatus of FIG. 1 in accordance with aspects of the present disclosure;

FIG. 8 is a schematic illustration of electrical couplings between portions of the apparatus of FIG. 1 in accordance with aspects of the present disclosure;

FIG. 9 is a schematic illustration of electrical couplings between portions of the apparatus of FIG. 1 in accordance with aspects of the present disclosure; and FIG. 10 is an exemplary flow diagram of a method for thermally managing a plurality of lithium-ion cells disposed within a housing in accordance with aspects of the present disclosure.

DETAILED DESCRIPTION

Referring to FIG. 1, the aspects of the present disclosure provide for an apparatus 100, such as a lithium-ion battery pack, that may prevent thermal runaway of a lithium-ion cell 110 within the apparatus 100 from propagating to surrounding lithium-ion cells within the apparatus 100. The apparatus 100, in accordance with aspects of the present disclosure, may provide lithium-ion cell-to-cell isolation while also dissipating heat of the individual lithium-ion cells 110. For example, the apparatus 100 includes a thermal dissipation member 130 that may satisfy lithium-ion cell 110 heat rejection needs under normal operating conditions of the lithium-ion cell 110. The thermal dissipation member 130, at least in part, collects thermal energy generated by the lithium-ion cells 110 within the apparatus 100 and transfers the thermal energy to a heat removal device, which may be one or more of a housing 140 of the apparatus 100 and other lithium-ion cells 110 within the apparatus 100. In the event of a thermal runaway of a lithium-ion cell 110, the lithium-ion cell-to-cell isolation and the dissipation of thermal energy from the thermal runaway event to the heat removal device may prevent propagation of the thermal runaway to other lithium-ion cells 110.

In accordance with aspects of the present disclosure, the lithium-ion cells 110 described herein are cylindrical small cell lithium-ion cells such as, for example, 18650 lithium-ion cells or other suitable small cell lithium-ion cells (e.g., 26650 lithium-ion cells, etc.). As an example, the lithium-ion cells 110 have normal operating parameters of about −10° C. (about 14° F.) to about 45° C. (about 113° F.) during charge and about −10° C. (about 14° F.) to about 60° C. (about 140° F.) during discharge. The cell vent temperature of the lithium-ion cells 110 may be about 90° C. (about 194° F.) to about 120° C. (about 248° F.). The thermal runaway temperature of the lithium-ion cells 110 may be about 180° C. (about 356° F.) to about 200° C. (about 392° F.). The aspects of the present disclosure may maintain lithium-ion cell temperatures within the normal operating ranges described above, while preventing (or reducing the likelihood of) single cell thermal runaway from propagating under abnormal operating conditions (such as at operating temperatures above the normal operating parameters).

During normal operation (see the normal operating temperatures above) of the lithium-ion cells, the aspects of the present disclosure may provide sufficient heat transfer from the one end (e.g., such as the negative terminal 310, see FIG. 3) of the lithium-ion cells 110 to prevent overheating of the lithium-ion cells 110. As noted above, the thermal dissipation member 130 transfers thermal energy from the lithium-ion cells 110 one or more of the housing 140 and other lithium-ion cells 110. The dissipation of thermal energy from one lithium-ion cell 110 to other lithium-ion cells 110 may reduce cell-to-cell thermal gradients. In the event one of the lithium-ion cells 110 enters a thermal runaway condition, the thermal coupling of the lithium-ion cell 110 with the thermal dissipation member 130 provides for the heat load of the thermal runaway event to be absorbed by the apparatus 100 (e.g., the housing 140 and other lithium-ion cells 110 within the housing 140). The mass of the lithium-ion cells 110 within the housing 140 and the housing 140 may maintain the remaining lithium-ion cells 110 (e.g., not experiencing thermal runaway) within the normal operating ranges described above. Thermal cell-to-cell isolation provided by the aspects of the present disclosure may prevent or reduce the likelihood of the thermal runaway event from directly impacting adjacent lithium-ion cells 110. The aspects of the present disclosure also provide a retainer plate 150 that may prevent or reduce the likelihood of, for example, one end (e.g., the positive terminal 320, see FIG. 3) of the lithium-ion cell from rupturing during thermal runaway. The retainer plate 150 may also contain at least some contents of the lithium-ion cell that exit the lithium-ion cell during the thermal runaway event and prevent or reduce the likelihood of the contents from spilling onto adjacent lithium-ion cells 110.

Illustrative, non-exhaustive examples, which may or may not be claimed, of the subject matter according to the present disclosure are provided below.

Still referring to FIGS. 1-5, the apparatus 100 includes a plurality of lithium-ion cells 110P, a cell support structure 120, a housing 140 in which the cell support structure is received, and the thermal dissipation member 130 disposed between the cell support structure 120 and the housing 140. The cell support structure 120 includes a plurality of chambers 127P. Each of the plurality of chambers 127P has at least one open end 200, 201 (see FIG. 2) and is configured to support a respective lithium-ion cell 110. The cell support structure 120 comprises walls 300 (FIG. 3) that form the plurality of chambers 127. The walls 300 are configured to thermally insulate a lithium-ion cell 110 disposed in one of the plurality of chambers 127 from another lithium-ion cell 110 disposed in an adjacent chamber 127 of the plurality of chambers 127P (see FIG. 3 illustrating a lithium-ion cell 110 in one chamber 127 and an empty adjacent chamber 127, and FIG. 5 illustrating lithium-ion cells 110 in adjacent chambers 127). In one aspect, the walls 300 of the plurality of chambers 127P form a honeycomb structure or pattern 500 (see FIG. 5). In other aspects, the walls 300 of the plurality of chambers 127P may have any suitable arrangement relative to each other.

To provide the thermal isolation between adjacent cells 110, the cell support structure 120 may be constructed of any suitable material having physical properties such as, for example, electrical isolation of about 3,000 kV/inch (about 1181 kV/cm) or greater, a thermal conductivity of about 0.23 BTU/hr-ft-° F. (about 1.3 W/m²-° C.) or less, a specific heat of about 0.52 BTU/lbm-° F. (about 2 kJ/kg-° C.) or greater, and a melting point of about 130° C. (about 266° F.) to about 140° C. (about 284° F.). One suitable example of material of which the cell support structure 120 may be constructed is high-density polyethylene. The low electrical conductivity of the cell support structure 120 may prevent lithium-ion cells 110 from shorting (e.g., prevent electrical contact between adjacent cells). The low thermal conductivity of the cell support structure 120 may prevent or reduce the likelihood of high lithium-ion cell temperatures (such as those noted herein) during a thermal runaway event from impacting adjacent lithium-ion cells 110. The high specific heat of the cell support structure 120 may absorb at least some of the thermal energy generated during a thermal runaway of at least one lithium-ion cell 110 disposed in the cell support structure 120. The melting point of the cell support structure 120 may be above at least the normal operating temperatures of the lithium-ion cells 110.

The cell support structure 120 may be constructed as a monolithic member into which the plurality of lithium-ion cells 110P are placed. In other aspects, the cell support structure 120 may be constructed of two or more cell support structure modules 121-125 (each module having a plurality of chambers 127P, FIG. 1) into which respective lithium-ion cell groups 111-115 are placed. The plurality of lithium-ion cells 110P may also be grouped into respective lithium-ion cell groups 111-115 when the plurality of lithium-ion cells are disposed in the monolithic cell support structure 120. It is noted that in FIG. 1 the cell support structure module 121 is illustrated with the plurality of chambers 127P while the cell support structure modules 122-125 are only schematically illustrated but are substantially similar to cell support structure module 121. It is further noted that in FIG. 1 the lithium-ion cell group 111 is illustrated as including lithium-ion cells 110 while the lithium-ion cell groups 112-115 are only schematically illustrated but are substantially similar to lithium-ion cell group 111.

The lithium-ion cells 110 of each lithium-ion cell group 111-115 may be coupled to each other so that each lithium-ion cell group 111-115 produces any suitable predetermined voltage, such as (for example) about 36V. The lithium-ion cells 110 may also be coupled to each other so that the respective lithium-ion cell group 111-115 remains partially operative after one or more lithium-ion cells 110 of the respective lithium-ion cell group 111-115 suffers a thermal runaway event. Arranging the plurality of lithium-ion cells 110P in the lithium-ion cell groups 111-115 may also maintain operability of the apparatus 100 in the event one or more of the lithium-ion cell groups 111-115 endures a thermal runaway event.

The plurality of lithium-ion cells 110P are thermally coupled to the thermal dissipation member through a respective open end (e.g., such as end 201, see FIG. 2) of a respective chamber 127. For example, the thermal dissipation member 130 is coupled to the plurality of lithium-ion cells 110P through a plurality of contact patches 400 (one of which contact patch is illustrated in FIG. 4) formed between negative terminals 310 (FIG. 4) of the plurality of lithium-ion cells 110P and the thermal dissipation member 130. The thermal dissipation member 130 is also thermally coupled to the housing 140 for transferring thermal energy to the housing 140. The coupling between the thermal dissipation member 130 and the housing 140 may be an abutting contact where substantially an entire major surface 131 of the thermal dissipation member 130 is in abutting contact with a corresponding surface 141 of the housing 140.

The thermal coupling between the plurality of lithium-ion cells 110P and the thermal dissipation member 130 and the thermal coupling between the thermal dissipation member 130 and the housing 140 are such that thermal energy from one of the lithium-ion cells 110 is dissipated to one or more of the housing 140 and other lithium-ion cells 110 of the plurality of lithium-ion cells 110P so as to maintain the one of the lithium-ion cells 110 below a predetermined temperature (or reduce the likelihood that the temperature will go above the predetermined temperature). In one aspect, the predetermined temperature may be an upper limit of the normal operating temperature of the lithium-ion cell 110. In another aspect, the predetermined temperature is less than a thermal runaway temperature of the lithium-ion cell 110. To dissipate thermal energy from the lithium-ion cells 110 during normal operation and during a thermal runaway event of at least one lithium-ion cell, the thermal dissipation member 130 has a thermal conductivity of about 3.50 BTU/hr-ft-° F. (about 19.8 W/m$^2$-° C.) or greater.

Disposing the thermal dissipation member 130 between the cell support structure 120 (and the lithium-ion cells 110 disposed therein) and the housing 140 electrically isolates the lithium-ion cells 110 from the housing 140 (e.g., prevents electrical contact between the lithium-ion cells 110 and the housing 140) and from each other. For example, the thermal dissipation member 130 has an electrical isolation or breakdown voltage of about 5,000 Vdc or greater. As described, herein the low electrical conductivity of the thermal dissipation member 130 provides for each lithium-ion cell 110 in the plurality of lithium-ion cells 110P to be directly coupled to the thermal dissipation member through the open end 201 (FIG. 2) of the cell support structure 120.

In accordance with the aspects of the present disclosure all electrical couplings between the lithium-ion cells 110 are disposed on a side of the cell support structure 120 that is opposite the thermal dissipation member 130. For example, referring to FIGS. 3 and 4, each lithium-ion cell 110 includes a negative terminal 310 and a positive terminal 320. The negative terminal 310 includes a negative lead 311 that extends from the negative terminal 310 along a longitudinal axis 119 (adjacent a side of the lithium-ion cell 110) beyond the positive terminal 320 so as to couple with circuit board 160. The positive terminal 320 also includes a positive lead 321 that extends from the positive terminal 320 to couple with the circuit board 160. Providing the positive and negative electrical couplings of the lithium-ion cells on a common side of the plurality of lithium-ion cells 110P facilitates the coupling of the lithium-ion cells 110 to the thermal dissipation member 130 in an electrically isolated manner. Providing the positive and negative electrical couplings of the lithium-ion cells on a common side of the plurality of lithium-ion cells 110P also provides for the thermal energy transfer from the lithium-ion cells 110 to the thermal dissipation member 130 and the housing 140 without interfering with the electrical couplings of the lithium-ion cells 110.

Referring to FIGS. 1-5, the apparatus 100 also includes at least one retainer plate 150 and at least one circuit board 160 (FIGS. 2-5). The at least one retainer plate 150 is coupled to the cell support structure 120 opposite the thermal dissipation member 130, so that the plurality of lithium-ion cells 110P extend from the cell support structure 120 into the at least one retainer plate 150. The at least one circuit board 160 is be coupled to a side of the at least one retainer plate 150 opposite the cell support structure 120. The at least one retainer plate 150 may be a monolithic member that receives the lithium-ion cells of each of the lithium-ion cell groups 111-115. Here the at least one circuit board may be configured such that each lithium-ion cell group 111-115 is electrically isolated from the other lithium-ion cell groups 111-115 so that the lithium-ion cell groups 111-115 are arranged in parallel with each other. In other aspects, the at least one retainer plate 150 includes two or more retainer plate modules 151-155 corresponding to a respective one of the lithium-ion cell groups 111-115. Each retainer plate module 151-155 may include a respective circuit board 161-165 coupled thereto.

Referring to FIGS. 2-6, the at least one retainer plate 150 may be constructed of any suitable material having the physical properties such as an electrical isolation of about 3,000 kV/inch or greater, a thermal conductivity of about 0.17 BTU/hr-ft-° F. (about 1 W/m$^2$-° C.) or less, a specific heat of about 0.52 BTU/lbm-° F. (about 2 kJ/kg-° C.) or less, and a melting point of about 700° F. or greater. On suitable exemplary material of which the retainer plate 150 may be constructed is polyether-ether-ketone. The retainer plate 150 may prevent lithium-ion cells from shorting, prevent heat transfer between lithium-ion cells, and absorb thermal energy during a thermal runaway event so that lithium-ion cells surrounding a thermal runaway event maintain normal operating temperatures (such as those described herein) or reduce the likelihood of the lithium-ion cells surrounding a thermal runaway event exceeding the normal operating temperatures. The at least one retainer plate 150 includes a plurality of complimenting chambers 600 (FIG. 6) that complement the plurality of chambers 127P of the cell support structure 120. As can be seen in FIGS. 2, 3, 4 and 5, a respective lithium-ion cell 110 extends from open end 200 of a respective chamber 127 of the cell support structure 120 to a respective complimenting chamber 600 of the at least one retainer plate 150. The complimenting chambers 600 may be configured to retain ruptured components (e.g., the positive terminal 320, electrolyte 118 (see FIG. 3), etc.) of the respective lithium-ion cell 110. For example, with reference again to FIG. 6, the complimenting chambers 600 each include an overflow reservoir 610 configured to receive and isolate the ruptured components of the respective lithium-ion cell 110 from other lithium-ion cells 110 of the plurality of lithium-ion cells 110P.

Each of the complimenting chambers 600 include standoffs 620 configured to maintain a predetermined venting space 450 (FIG. 4) between an end 460 (FIG. 4) of the respective lithium-ion cell 110 and the at least one retainer plate 150. The standoffs 620 may also maintain pressure on the respective lithium-ion cell 110, so as to substantially prevent the end 460 of the respective lithium-ion cell 110 from separating from the rest of the respective lithium-ion cell 110 during a thermal runaway event. For example, the venting space 450 may at least form a plenum with the overflow reservoir 610 and be suitably sized to allow gases to vent from the end 460 into the venting space 450. In other aspects, the venting space 450 may include a plenum 470 (FIGS. 4, 4A, and 4B) formed between the at least one retainer plate 150 and the at least one circuit board 160 where gases 471 (FIG. 4) pass from venting space 450 (e.g., through the overflow reservoir 610) to the plenum 470. The at least one circuit board 160 may be spaced from the at least one retainer plate 150 in any suitable manner, such as with any suitable standoffs, to form the plenum 470. Referring to FIGS. 4A and 4B, the at least one circuit board 160 may be spaced from the at least one retainer plate 150 any suitable distance 499 to form the plenum 470. For example, in one aspect, the distance 499 may be about 0.05 inch (1.3 mm) while in other aspects the distance 499 may be greater or less than about 0.05 inch (1.3 mm). The at least one circuit board 160 may be constructed of layers that include, for example, a thermally dissipative negative bus layer 421 and a thermally dissipative positive bus layer 422. The negative leads 311 of respective lithium-ion cells 110 are coupled to the negative bus layer 421 while the positive leads 321 are coupled to the positive bus layer 422. Any suitable fuse 420 may be disposed between the positive leads 321 and the positive bus layer so that one lithium-ion cell 110 may be taken off-line while the respective lithium-ion cell group 111-115 continues to operate. The at least one circuit board 160 is constructed so as to have a poor lithium-ion cell to cell thermal path. Each of the at least one circuit board 160 may be coupled to a main circuit board 410 through any suitable flexible circuit(s) 490 and connector(s) 491. The main circuit board 410 couples the lithium-ion cells 110 to electrical terminal 800 (FIGS. 7 and 8) or any suitable module bus (901-905). The at least one circuit board 160 and the main circuit board 410 may be configured to provide for operability of the apparatus 100 in the event one or more respective lithium-ion cells 110 coupled to the at least one circuit board 160 becomes inoperable and/or in the event a respective module 701-705 (FIG. 5) becomes inoperable.

In other aspects, referring again to FIG. 4, the at least one circuit board may include one or more apertures 480 in communication with the venting space 450. FIG. 4 illustrates alternative magnified views of a portion of the venting space 450 and different plenums 470, 472 formed thereby and/or in communication therewith. Here a plenum 472 (FIG. 4) may be formed between the at least one circuit board 160 and a housing cover 170 (FIGS. 1 and 4) of the apparatus such that gases 471 from the venting space 450 pass through the one or more apertures 480 into the plenum 472. It is noted that the fluid communication between the venting space and the plenum may be configured so that the gases 471 pass from the venting space 450 to the plenum 470, 472 while the ruptured components (e.g., the positive terminal 320, electrolyte 118, etc.) are retained within the overflow reservoir 610.

Referring still to FIGS. 2-6, one or more seals may be provided in the retainer plate so as to direct the gas 471 from the venting space to the plenum 470, 472. For example, assembly of the thermal dissipating member 130, the cell support structure 120, the retainer plate 150 and the circuit board 160 into the housing 140 may compress at least the thermal dissipating member 130, the cell support structure 120, and the retainer plate 150 together so that each composite chamber formed by the plurality of chambers 127P and respective complimenting chambers 600 is sealed from other composite chambers formed by other ones of the plurality of chambers 127P and respective complimenting chambers 600. In other aspects, any suitable seal 485 (such as an o-ring, see FIG. 4) may be provided between the at least one retainer plate 150 and the lithium-ion cells 110 so as to direct the gases 471 towards the plenum 470, 472 and prevent migration of the gases towards the thermal dissipating member 130.

Referring to FIGS. 1, 7, 8, and 9, the lithium-ion cells 110 may be arranged in modules 701-705 (FIG. 7). Each of the modules 701-705 includes a respective cell support structure module 121-125, respective lithium-ion cell groups 111-115, a respective retainer plate module 151-155, and a respective module circuit board 161-165. The plurality of lithium-ion cells 110P are grouped into at least one module 701-705 so as to have a predetermined module voltage, such as for example about 36V. As described above, each of the at least one module 701-705 includes a module circuit board 161-165 coupled to the respective retainer plate module 151-155 and the lithium-ions cells 110 of the at least one module 701-705 include positive leads 321 and negative leads 311 that extend through the respective retainer plate module 151-155 for coupling with the module circuit board 161-165. In one aspect, as shown in FIGS. 7 and 8, the housing 140 includes an electrical terminal 800 and the module circuit board 161-165 of each of the at least one module 701-705 (e.g., through the main circuit board 410 (FIG. 4A)) are coupled in parallel and provide a total power output (such as the 36V) to the electrical terminal 800. In another aspect, as illustrated in FIG. 9, each of the at least one module 701-705 includes a module electrical terminal 801-805 that is isolated from and in parallel with the module electrical terminals 801-805 of another of the at least one module 701-705. Here, each of the module electrical terminals 801-805 may be arranged in parallel for coupling with a respective module bus 901-905 that carries power from a respective module 701-705 to a remote terminal(s) 910. As described above, the module circuit board 161-165 may be constructed of layers that include, for example, a thermally dissipative negative bus layer 421 and a thermally dissipative positive bus layer 422. Here the module circuit board 161-165 thermally isolates the lithium-ion cells 110 within a respective module 701-705 from each other.

Referring to FIGS. 1-4 and 10 an exemplary method for thermally managing a plurality of lithium-ion cells 110P disposed within a housing 140 will be described. The method includes thermally coupling the plurality of lithium-ion cells 110P to each other through a thermal dissipation member 130 (FIG. 10, Block 1000) disposed between the housing 140 and the plurality of lithium-ion cells 110P. The method also includes dissipating thermal energy from one of the plurality of lithium-ion cells 110 to at least another of the lithium-ion cells 110 through at least the thermal dissipation member 130 (FIG. 10, Block 1005). Thermal energy is transferred from the thermal dissipation member 130 to the housing 140 (FIG. 10, Block 1010) where the thermal energy is dissipated from the one of the plurality of lithium-ion cells 110 to one or more of the housing 140 and the other of the lithium-ion cells 110 through the thermal dissipation member 130 and the housing 140. The plurality of lithium-ion cells may be thermally insulated from each other (FIG. 10, Block 1003) with the cell support structure 120 disposed within the housing 140, where the cell support structure 120 has the plurality chambers 127P, and the plurality of lithium-ion cells 110P are thermally coupled to the thermal dissipation member 130 through a respective open end 201 of a respective chamber 127. In one aspect, at least two of the plurality of lithium-ion cells 110 are coupled to each other through a circuit board 160, where the method further comprises thermally insulating the at least two lithium-ion cells 110 from each other with the circuit board 160. In one aspect, the dissipation of the thermal energy maintains the plurality of lithium-ion cells below the predetermined temperature(s) described herein (e.g., such as a thermal runaway temperature of the plurality of lithium-ion cells 110P).

Ruptured components of a respective lithium-ion cell may be retained (FIG. 10, Block 1006) within a chamber 600 of a retainer plate 150 coupled to the cell support structure 120 opposite the thermal dissipation member 130. In one aspect, the ruptured components of the respective lithium-ion cell 110 are retained and isolated from other lithium-ion cells 110 of the plurality of lithium-ion cells 110P by at least an overflow reservoir 610 of the chamber 600 of the retainer plate 150. In one aspect, at least one of the plurality of lithium-ion cells is vented through the retainer plate 150 (FIG. 10, Block 1007).

In one aspect, the method further includes electrically isolating the plurality of lithium-ion cells 110P from the housing 140 (FIG. 10, Block 1001) with the thermal dissipation member 130. The plurality of lithium-ion cells 110P may also be electrically isolated from each other (FIG. 10, Block 1002) with the thermal dissipation member 130.

The following are provided in accordance with the aspects of the present disclosure:

A1. An apparatus comprising:
a plurality of lithium-ion cells;
a cell support structure having a plurality of chambers, each of the plurality of chambers has at least one open end and is configured to support a respective lithium-ion cell;
a housing in which the cell support structure is received; and
a thermal dissipation member disposed between the cell support structure and the housing;
wherein the plurality of lithium-ion cells are thermally coupled to the thermal dissipation member through a respective open end of a respective chamber, and the thermal dissipation member is thermally coupled to the housing.

A2. The apparatus of paragraph A1, wherein the thermal coupling between the plurality of lithium-ion cells and the thermal dissipation member and the thermal coupling between the thermal dissipation member and the housing are such that thermal energy from one of the lithium-ion cells is dissipated to the housing so as to maintain the one of the lithium-ion cells below a predetermined temperature.

A3. The apparatus of any of paragraphs A1-A2, wherein the thermal coupling between the plurality of lithium-ion cells and the thermal dissipation member and the thermal coupling between the thermal dissipation member and the housing are such that thermal energy from one of the lithium-ion cells is dissipated to other lithium-ion cells of the plurality of lithium-ion cells so as to maintain the one of the lithium-ion cells below a predetermined temperature.

A4. The apparatus of any of paragraphs A2-A3, wherein the predetermined temperature is less than a thermal runaway temperature of the one of the lithium-ion cells.

A5. The apparatus of any of paragraphs A1-A4, wherein the plurality of chambers form a honeycomb structure.

A6. The apparatus of any of paragraphs A1-A5, wherein the cell support structure comprises walls that form the plurality of chambers, the walls being configured to thermally insulate a lithium-ion cell disposed in one of the plurality of chambers from another lithium-ion cell disposed in an adjacent chamber of the plurality of chambers.

A7. The apparatus of any of paragraphs A1-A6, wherein the plurality of lithium-ion cells comprise small cell lithium-ion cells.

A8. The apparatus of any of paragraphs A1-A7, wherein the thermal dissipation member electrically isolates the plurality of lithium-ion cells from the housing.

A9. The apparatus of any of paragraphs A1-A8, wherein the thermal dissipation member electrically isolates the plurality of lithium-ion cells from each other.

A10. The apparatus of any of paragraphs A1-A9, wherein the thermal dissipation member is coupled to the plurality of lithium-ion cells through a plurality of contact patches formed between negative terminals of the plurality of lithium-ion cells and the thermal dissipation member.

A11. The apparatus of any of paragraphs A1-A10, wherein the housing is coupled to a heat sink.

A12. The apparatus of any of paragraphs A1-A11, further comprising at least one retainer plate, the at least one retainer plate being coupled to the cell support structure opposite the thermal dissipation member so that the plurality of lithium-ion cells extend from the cell support structure into the at least one retainer plate.

A13. The apparatus of paragraph A12, wherein the at least one retainer plate includes a plurality of complimenting chambers that complement the plurality of chambers, where a respective lithium-ion cell extends from a respective chamber to a respective complimenting chamber.

A14. The apparatus of paragraph A13, wherein the complimenting chambers are configured to retain ruptured components of the respective lithium-ion cell.

A15. The apparatus of any of paragraphs A13-A14, wherein the complimenting chambers each include an overflow reservoir configured to receive and isolate the ruptured components of the respective lithium-ion cell from other lithium-ion cells of the plurality of lithium-ion cells.

A16. The apparatus of any of paragraphs A13-A15, wherein the complimenting chambers each include standoffs configured to maintain a predetermined venting space between an end of the respective lithium-ion cell and the at least one retainer plate.

A17. The apparatus of any of paragraphs A12-A16, wherein the plurality of lithium-ion cells are grouped into at least one module having a predetermined module voltage, where each of the at least one module has a respective retainer plate.

A18. The apparatus of paragraph A17, wherein each of the at least one module includes a module circuit board coupled to the respective retainer plate and the lithium-ions cells of the at least one module include positive and negative leads that extend through the respective retainer plate for coupling with the module circuit board.

A19. The apparatus of paragraph A18, wherein the housing includes an electrical terminal and the module circuit board of each of the at least one module are coupled in parallel and provide a total power output to the electrical terminal.

A20. The apparatus of any of paragraphs A18-A19, wherein each of the at least one module includes an electrical terminal that is isolated from and in parallel with electrical terminals of another of the at least one module.

A21. The apparatus of any of paragraphs paragraph A18-A20, wherein the module circuit board thermally isolates the lithium-ion cells within a respective module from each other.

A22. The apparatus of any of paragraphs A1-A21, wherein the plurality of lithium-ion cells comprise cylindrical lithium-ion cells.

B1. An apparatus comprising:
a plurality of lithium-ion cells;
a housing in which the plurality of lithium-ion cells are disposed; and
a thermal dissipation member disposed between the housing and the plurality of lithium-ion cells, the thermal dissipation member being thermally coupled to the plurality of lithium-ion cells so as to dissipate thermal energy from one of the plurality of lithium-ion cells to at least another of the lithium-ion cells, at least partially through the thermal dissipation member.

B2. The apparatus of paragraph B1, further comprising:
a cell support structure disposed within the housing, the cell support structure having a plurality chambers, each of the plurality of chambers has at least one open end and is configured to support a respective lithium-ion cell;
wherein the plurality of lithium-ion cells are thermally coupled to the thermal dissipation member through a respective open end of a respective chamber.

B3. The apparatus of paragraph B2, wherein the plurality of chambers form a honeycomb structure.

B4. The battery pack of any of paragraphs B2-B3, wherein the cell support structure comprises walls that form the plurality of chambers, the walls being configured to thermally insulate a lithium-ion cell disposed in one of the plurality of chambers from another lithium-ion cell disposed in an adjacent chamber of the plurality of chambers.

B5. The apparatus of any of paragraphs B2-B4, further comprising at least one retainer plate, the at least one retainer plate being coupled to the cell support structure opposite the thermal dissipation member so that the plurality of lithium-ion cells extend from the cell support structure into the at least one retainer plate.

B6. The apparatus of paragraph B5, wherein the at least one retainer plate includes a plurality of complimenting chambers that complement the plurality of chambers, where a respective lithium-ion cell extends from a respective chamber to a respective complimenting chamber.

B7. The apparatus of paragraph B6, wherein the complimenting chambers are configured to retain ruptured components of the respective lithium-ion cell.

B8. The apparatus of any of paragraphs B6-B7, wherein the complimenting chambers each include an overflow reservoir configured to receive and isolate the ruptured components of the respective lithium-ion cell from other lithium-ion cells of the plurality of lithium-ion cells.

B9. The apparatus of any of paragraphs B6-B8, wherein the complimenting chambers each include standoffs configured to maintain a predetermined venting space between an end of the respective lithium-ion cell and the at least one retainer plate.

B10. The apparatus of paragraph B5, wherein the plurality of lithium-ion cells are grouped into at least one module having a predetermined module voltage, where each of the at least one module has a respective retainer plate.

B11. The apparatus of paragraph B10, wherein each of the at least one module includes a module circuit board coupled to the respective retainer plate and the lithium-ions cells of the at least one module include positive and negative leads that extend through the respective retainer plate for coupling with the module circuit board.

B12. The apparatus of paragraph B11, wherein the housing includes an electrical terminal and the module circuit board of each of the at least one module are coupled in parallel and provide a total power output to the electrical terminal.

B13. The apparatus of any of paragraphs B11-B12, wherein each of the at least one module includes an electrical terminal that is isolated from and in parallel with electrical terminals of another of the at least one module.

B14. The apparatus of any of paragraphs B11-B12, wherein the module circuit board thermally isolates the lithium-ion cells within a respective module from each other.

B15. The apparatus of any of paragraphs B1-B14, wherein the thermal dissipation member is thermally coupled to the housing so as to dissipate thermal energy from the one of the plurality of lithium-ion cells to the housing.

B16. The apparatus of paragraph B15, wherein the thermal coupling between the plurality of lithium-ion cells and the thermal dissipation member and the thermal coupling between the thermal dissipation member and the housing are such that thermal energy from one of the lithium-ion cells is dissipated to the housing so as to maintain the one of the lithium-ion cells below a predetermined temperature.

B17. The apparatus of paragraph B15, wherein the thermal coupling between the plurality of lithium-ion cells and the thermal dissipation member and the thermal coupling between the thermal dissipation member and the housing are such that thermal energy from one of the lithium-ion cells is dissipated to other lithium-ion cells of the plurality of lithium-ion cells so as to maintain the one of the lithium-ion cells below a predetermined temperature.

B18. The apparatus of any of paragraphs B16-B17, wherein the predetermined temperature is less than a thermal runaway temperature of the one of the lithium-ion cells.

B19. The apparatus of any of paragraphs B1-B18, wherein the plurality of lithium-ion cells comprise small cell lithium-ion cells.

B20. The apparatus of any of paragraphs B1-B19, wherein the thermal dissipation member electrically isolates the plurality of lithium-ion cells from the housing.

B21. The apparatus of any of paragraphs B1-B20, wherein the thermal dissipation member electrically isolates the one of the plurality of lithium-ion cells from another of the lithium-ion cells.

B22. The apparatus of any of paragraphs B1-B21, wherein the thermal dissipation member is coupled to the plurality of lithium-ion cells through a plurality of contact patches formed between negative terminals of the plurality of lithium-ion cells and the thermal dissipation member.

B23. The apparatus of any of paragraphs B1-B22, wherein the housing is coupled to a heat sink.

B24. The apparatus of any of paragraphs B1-B23, wherein the plurality of lithium-ion cells comprise cylindrical lithium-ion cells.

C1. A method for thermally managing a plurality of lithium-ion cells disposed within a housing, the method comprising:

thermally coupling the plurality of lithium-ion cells to each other through a thermal dissipation member disposed between the housing and the plurality of lithium-ion cells;

wherein thermal energy is dissipated from one of the plurality of lithium-ion cells to at least another of the lithium-ion cells through at least the thermal dissipation member.

C2. The method of paragraph C1, further comprising transferring thermal energy from the thermal dissipation member to the housing where thermal energy is dissipated from the one of the plurality of lithium-ion cells to the housing.

C3. The method of any of paragraphs C1-C2, further comprising thermally insulating the plurality of lithium-ion cells from each other with a cell support structure disposed within the housing, wherein:

the cell support structure has a plurality chambers, each of the plurality of chambers has at least one open end and is configured to support a respective lithium-ion cell; and the plurality of lithium-ion cells are thermally coupled to the thermal dissipation member through a respective open end of a respective chamber.

C4. The method of paragraph C3, further comprising retaining ruptured components of a respective lithium-ion cell within a chamber of a retainer plate coupled to the cell support structure opposite the thermal dissipation member.

C5. The method of paragraph C4, wherein the ruptured components of the respective lithium-ion cell are retained and isolated from other lithium-ion cells of the plurality of lithium-ion cells by at least an overflow reservoir of the chamber of the retainer plate.

C6. The method of any of paragraphs C4-C5, further comprising venting at least one of the plurality of lithium-ion cells through the retainer plate.

C7. The method of any of paragraphs C1-C6, wherein at least two of the plurality of lithium-ion cells are coupled to each other through a circuit board, the method further comprising thermally insulating the at least two lithium-ion cells from each other with the circuit board.

C8. The method of any of paragraphs C1-C7, wherein dissipation of the thermal energy maintains the plurality of lithium-ion cells below a predetermined temperature.

C9. The method of paragraph C8, wherein the predetermined temperature is a thermal runaway temperature of the plurality of lithium-ion cells.

C10. The method of any of paragraphs C1-C9, further comprising electrically isolating the plurality of lithium-ion cells from the housing with the thermal dissipation member.

C11. The method of any of paragraphs C1-C10, further comprising electrically isolating the plurality of lithium-ion cells from each other with the thermal dissipation member.

C12. The method of any of paragraphs C1-C11, further comprising transferring thermal energy from the thermal dissipation member to the housing where thermal energy is dissipated from the one of the plurality of lithium-ion cells to other lithium-ion cells through the thermal dissipation member and the housing.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 10, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 10 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es), system(s), and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An apparatus comprising:
   a plurality of lithium-ion cells;
   a cell support structure having thermally insulating walls that form a plurality of isolation chambers, wherein each of the plurality of isolation chambers has at least one open end and is configured to support a respective lithium-ion cell where lithium-ion cells located in adjacent isolation chambers are thermally insulated from each other within the cell support structure by the thermally insulating walls;
   a housing in which the cell support structure is received; and
   a thermal dissipation member disposed between the cell support structure and the housing, wherein the thermal dissipation member is configured to close the at least one open end of each of the plurality of isolation chambers, and wherein the thermal dissipation member physically isolates each isolation chamber from each other isolation chamber;
   wherein each of the plurality of lithium-ion cells is in contact with and conductively thermally coupled to the thermal dissipation member through a respective open end of a respective isolation chamber, and wherein the thermal dissipation member is in contact with and conductively thermally coupled to the housing so as to collectively configure each of the plurality of lithium-ion cells, the thermal dissipation member, and the housing as a heat sink, where the conductive thermal coupling between the plurality of lithium-ion cells and the thermal dissipation member and the conductive thermal coupling between the thermal dissipation member and the housing are such that thermal energy from one of the lithium-ion cells is dissipated to the housing and other lithium-ion cells of the plurality of lithium-ion cells so as to maintain the one of the lithium-ion cells below a predetermined temperature.

2. The apparatus of claim 1, wherein the predetermined temperature is less than a thermal runaway temperature of the one of the lithium-ion cells.

3. The apparatus of claim 1, wherein the thermal dissipation member electrically isolates the plurality of lithium-ion cells from the housing.

4. The apparatus of claim 1, wherein the thermal dissipation member electrically isolates the plurality of lithium-ion cells from each other.

5. The apparatus of claim 1, wherein the thermal dissipation member is coupled to the plurality of lithium-ion cells through a plurality of contact patches formed between negative terminals of the plurality of lithium-ion cells and the thermal dissipation member.

6. The apparatus of claim 1, further comprising at least one retainer plate, the at least one retainer plate being coupled to the cell support structure opposite the thermal dissipation member so that the plurality of lithium-ion cells extend from the cell support structure into the at least one retainer plate.

7. The apparatus of claim 6, wherein the at least one retainer plate includes a plurality of complementing chambers that complement the plurality of isolation chambers, and wherein a respective lithium-ion cell extends from a respective isolation chamber to a respective complementing chamber.

8. The apparatus of claim 7, wherein the plurality of complementing chambers are configured to retain ruptured components of the respective lithium-ion cell.

9. The apparatus of claim 7, wherein each complementing chamber from the plurality of complementing chambers includes standoffs configured to maintain a predetermined venting space between an end of the respective lithium-ion cell and the at least one retainer plate.

10. An apparatus comprising:
    a plurality of lithium-ion cells disposed within and supported by respective isolation chambers of a thermally insulating cell support structure;
    a housing in which the plurality of lithium-ion cells are disposed; and
    a thermal dissipation member disposed between the housing and the plurality of lithium-ion cells so as to collectively form a heat sink with each lithium-ion cell of the plurality of lithium-ion cells and the housing, wherein the thermal dissipation member is configured to close a respective open end of each of the respective isolation chambers to physically isolate each isolation chamber from each other isolation chamber, and wherein the thermal dissipation member is in contact with and thermally coupled to the plurality of lithium-ion cells so as to dissipate thermal energy from one of the plurality of lithium-ion cells to the housing and at least another of the plurality of lithium-ion cells, through the thermal dissipation member.

11. The apparatus of claim 10, wherein:
the thermally insulating cell support structure is disposed within the housing; and
the plurality of lithium-ion cells are thermally coupled to the thermal dissipation member through the respective open ends of the respective isolation chambers.

12. The apparatus of claim 11, further comprising at least one retainer plate, the at least one retainer plate being coupled to the cell support structure opposite the thermal dissipation member so that the plurality of lithium-ion cells extend from the cell support structure into the at least one retainer plate.

13. The apparatus of claim 12, wherein the plurality of lithium-ion cells are grouped into at least one module having a predetermined module voltage, and wherein each of the at least one module has a respective retainer plate.

14. The apparatus of claim 13, wherein each of the at least one module includes a module circuit board coupled to the respective retainer plate and the lithium-ions cells of the at least one module include positive and negative leads that extend through the respective retainer plate for coupling with the module circuit board.

15. A method for thermally managing the plurality of lithium-ion cells in the apparatus of claim 1, the method comprising:
thermally coupling the plurality of lithium-ion cells to each other through the thermal dissipation member disposed between the housing and the plurality of lithium-ion cells;
wherein thermal energy is dissipated from one of the plurality of lithium-ion cells to at least another of the plurality of lithium-ion cells through at least the thermal dissipation member.

16. The method of claim 15, further comprising transferring thermal energy from the thermal dissipation member to the housing where thermal energy is dissipated from the one of the plurality of lithium-ion cells to one or more of the housing and the other of the plurality of lithium-ion cells through the thermal dissipation member and the housing.

17. The method of claim 15, further comprising thermally insulating the plurality of lithium-ion cells from each other with a cell support structure disposed within the housing, wherein:
the cell support structure has a plurality of chambers, wherein each of the plurality of chambers has at least one open end and is configured to support a respective lithium-ion cell; and
the plurality of lithium-ion cells are thermally coupled to the thermal dissipation member through a respective open end of a respective chamber.

18. The method of claim 17, further comprising retaining ruptured components of a respective lithium-ion cell within a chamber of a retainer plate coupled to the cell support structure opposite the thermal dissipation member.

19. The apparatus of claim 8, wherein the complementing chambers each include an overflow reservoir configured to receive and isolate the ruptured components of the respective lithium-ion cell from other lithium-ion cells of the plurality of lithium-ion cells.

20. The apparatus of claim 14, wherein each of the at least one module includes an electrical terminal that is isolated from and in parallel with electrical terminals of another of the at least one module.

* * * * *